United States Patent [19]
Anderson et al.

[11] Patent Number: 5,516,016
[45] Date of Patent: May 14, 1996

[54] CONTAINER HOLDER

[75] Inventors: Rick A. Anderson, Grand Haven; Patrick W. Messock, Grand Rapids, both of Mich.

[73] Assignee: Prince Corporation, Holland, Mich.

[21] Appl. No.: 217,259

[22] Filed: Mar. 24, 1994

[51] Int. Cl.$^6$ ............................................ B60N 3/10
[52] U.S. Cl. .................... 224/282; 224/926; 248/311.2
[58] Field of Search ........................... 224/282, 42.08, 224/42.44, 926; 296/37.12, 37.13, 37.8; 297/188.15, 188.16, 188.04; 248/311.2

[56] References Cited

U.S. PATENT DOCUMENTS

| | | | |
|---|---|---|---|
| 4,828,211 | 5/1989 | McConnell et al. | 248/311.2 |
| 4,836,602 | 6/1989 | d'Almada Remedios et al. | |
| 4,877,164 | 10/1989 | Baucom. | |
| 4,936,624 | 6/1990 | West | 224/282 X |
| 5,072,989 | 12/1991 | Spykerman et al. | |
| 5,104,187 | 4/1992 | Fischer et al. | |
| 5,342,009 | 8/1994 | Lehner | 248/311.2 |
| 5,375,907 | 12/1994 | Rogers | 297/188.15 X |
| 5,385,378 | 1/1995 | Hakamada et al. | 296/37.12 |

FOREIGN PATENT DOCUMENTS

491775 9/1938 United Kingdom .................. 224/282

*Primary Examiner*—Renee S. Luebke

[57] ABSTRACT

A container holder assembly includes a base defining a recess, a container holder adapted to mateably cover the recess, and a hinge mechanism mounting the container holder to the base for movement between a storage position, a use position and a collapsed position. The hinge is configured to position the container holder against the base to cover the recess when in the storage position, and is further configured to lift and extend the container holder as the container holder is moved to the use position. In the use position, the container holder is extended away from the base and supported in a raised position with respect to the bottom of the recess with a container holding aperture forming portion of the container holder facing generally upwardly for use. An over-pressure release on the hinge prevents damage to the container holder by allowing the container holder to collapse from the use position upon application of an excessive load. The release on the container holder can be reset by manually pivoting the container holder upwardly back to the use position.

26 Claims, 3 Drawing Sheets

CONTAINER HOLDER

BACKGROUND OF THE INVENTION

The present invention concerns container holders for vehicles, and more particularly concerns a container holder configured to prevent damage during misuse.

Many container holders in vehicles are mounted for movement between a storage position and a use position. In time storage position, time container holder is hidden away for aesthetics and to increase passenger compartment space. In the use position, the container holder is extended, frequently in a cantilever arrangement, to conveniently locate the container holder in the passenger compartment of the vehicle. However, a problem exists in that, when extended to time use position, time container holder is vulnerable to being accidentally over-stressed and damaged, such as by inadvertently forcing the container holder to move beyond its intended use position. This problem is particularly troublesome for a container holder mounted near a floor of time vehicle in a location where it is likely to be accidentally stepped on, or near an armrest in a location where it is likely to be leaned on.

At least one container holder has been designed to break loose if the container holder is forcibly pivoted beyond its designed path of movement. However, by breaking loose, the container holder becomes a separate part and may become lost. Further, each time the container holder is broken loose, time connection may tend to weaken or degrade such that time minimum pressure required to break loose gradually decreases over time.

Thus, a container holder solving the aforementioned problems is desired.

SUMMARY OF THE INVENTION

A container holder assembly of the present invention has a base, and a container holder movably mounted to the base for movement between a storage position, a use position and a third damage preventing collapsed position. A pressure sensitive release holds time container holder in time use position but allows time container holder to move to the collapsed position from time use position upon application of an excessive force on the container holder. The pressure sensitive release can be re-engaged by moving the container holder back to the use position from the collapsed position. In all positions, the container holder remains attached to the base.

These and other features and advantages of the present invention will be further understood and appreciated by those skilled in the art by reference to the following specification, claims and appended drawings.

DETAILED DESCRIPTION OF PREFERRED EMBODIMENT

Figure 4:
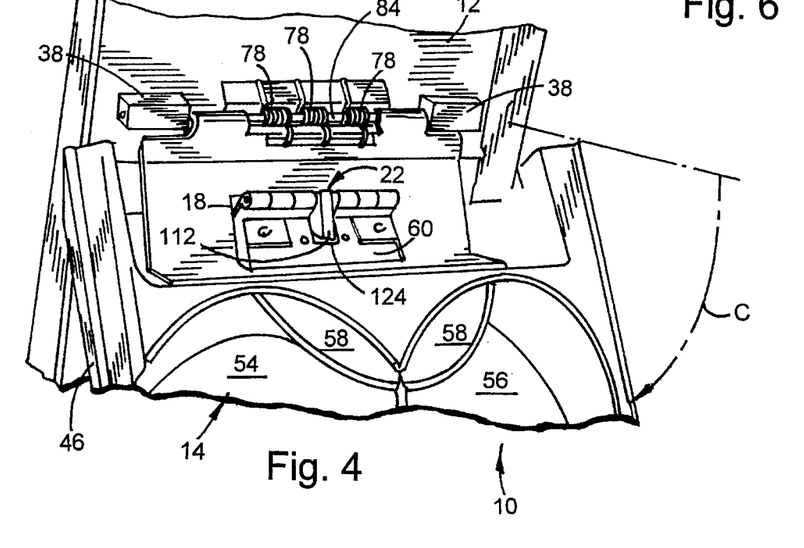
FIG. 4 is a fragmentary perspective fragmentary view of the container holder assembly shown in FIG. 1, the container holder being shown in the collapsed position.
Figure 5:
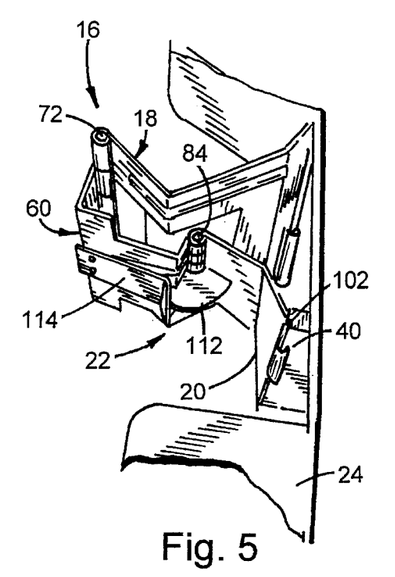
FIGS. 5 and 6 are fragmentary perspective views of the hinge mechanism for the container holder, the hinge mechanism being shown in the use position, the container holder having been removed to more clearly show the hinge mechanism.
Figure 6:
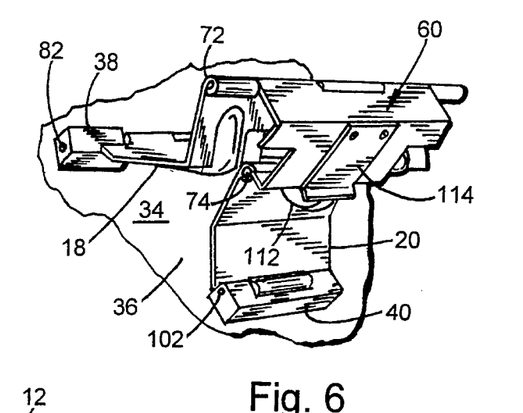
Figure 9:
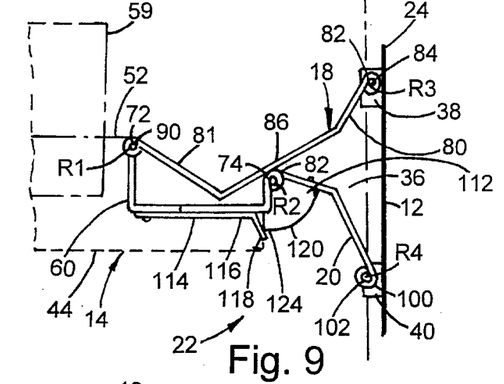
FIG. 9 is a left side schematic view of the hinge mechanism shown in FIG. 7, the hinge mechanism being shown in the fully open use position.
Figure 10:
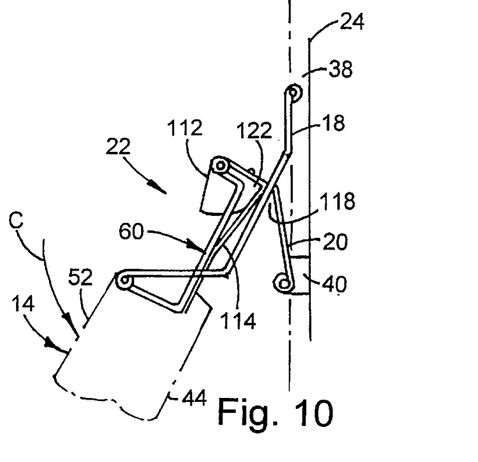
FIG. 10 is a left side schematic view of the hinge mechanism shown in FIG. 7, the hinge mechanism being shown in the collapsed position.

A container holder assembly 10 (FIGS. 1–4) embodying the present invention includes a base 12, a container holder 14, and a hinge mechanism 16 movably mounting the container holder 14 to the base 12. Hinge 16 (FIG. 7) includes upper and lower hinge members 18 and 20 pivotally mounted to container holder 14 and to base 12 in a spaced-apart double bar linkage arrangement. The linkage arrangement allows container holder 14 to move between a vertical storage position adjacent base 12 (FIGS. 1 and 7), a raised horizontal use position extended from base 12 (FIGS. 2, 3 and 9), and a collapsed position generally below base 12 (FIGS. 4 and 10). A pressure sensitive release 22 is mounted on hinge member 20 and is configured to hold container holder 14 in the use position, but release container holder 14 to the collapsed position if an excessive force is exerted on container holder 14. Release 22 can be conveniently reset by lifting container holder 14 from the collapsed position back to the use position.

The illustrated base 12 (FIG. 1) is attached to the rear of an armrest/console component 24 between front seats 26 and 28, although it is contemplated that the base 12 can be mounted in other locations in a vehicle. Base 12 (FIGS. 2 and 3) includes sidewalls 30 and 31, upper wall 32, lower wall 33 and a back wall 34 defining a recess 36 shaped to mateably receive container holder 14. Upper and lower pivot supports 38 (and 40) are formed by a bracket on the back wall 34 of component 24. A pair of stops 42 are located above upper pivot support 38 in recess 36 for engaging container holder 14 when pivoted into recess 36 to assure proper alignment when container holder 14 is closed.

Figures 1, 2, 3:
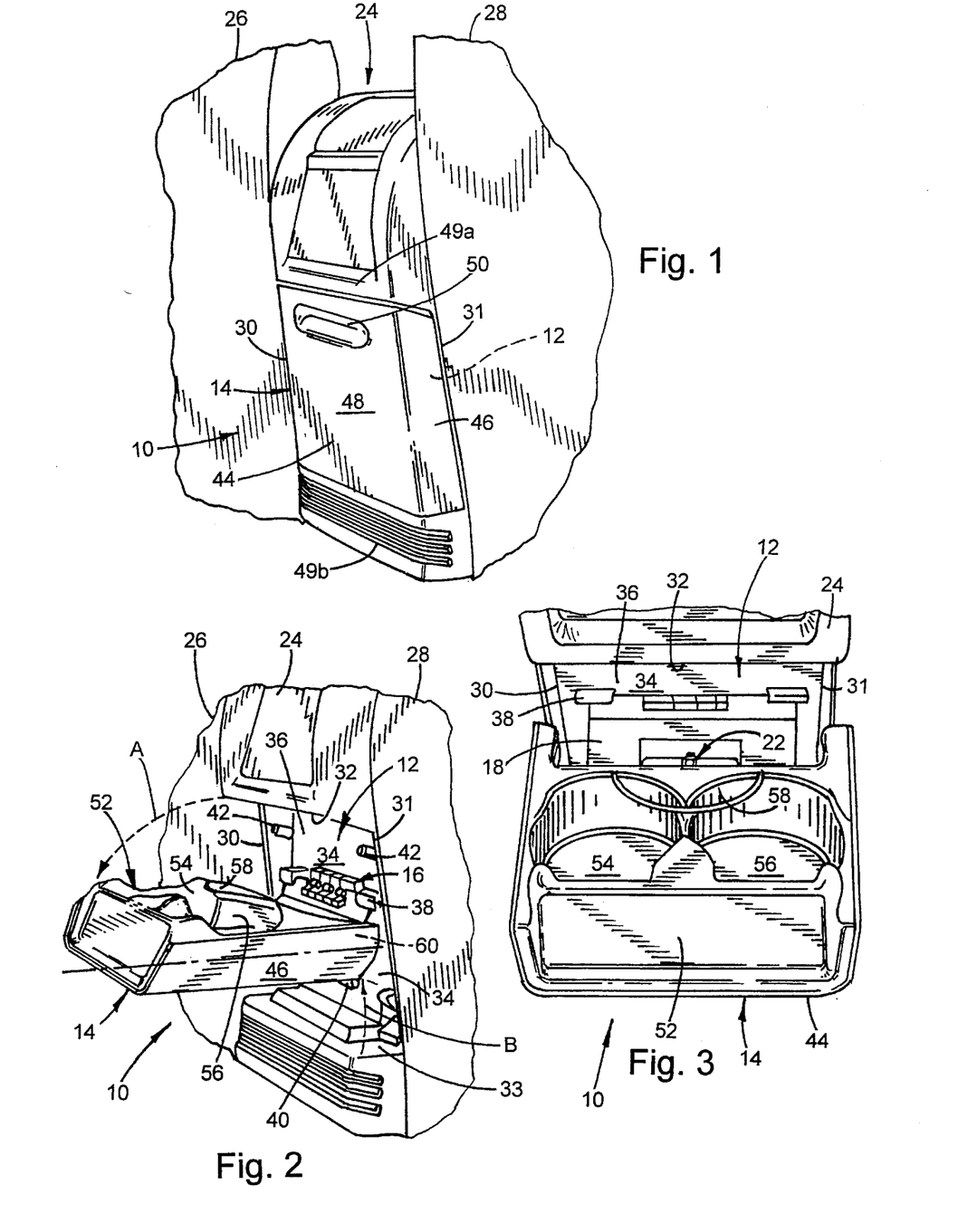
FIG. 1 is a fragmentary perspective view of a vehicle interior showing a container holder assembly and armrest embodying the present invention, the container holder of the assembly being shown in the storage position.
FIG. 2 is a fragmentary perspective view of the container holder assembly shown in FIG. 1, the container holder being shown in the use position.
FIG. 3 is a fragmentary top perspective view of the container holder assembly shown in FIG. 2.

Container holder 14 (FIG. 1) includes an outer shell 44 shaped to cover recess 36. Shell 44 includes side sections 46 that align with recess sidewalls 30 and 31, and further includes a generally planar wall section 48 that aligns with the rear surfaces 49a and 49b of armrest/console component 24 when container holder 14 is in the closed storage position. A handle forming depression 50 (FIG. 1) is located in wall section 48. Depression 50 forms a finger hold that can be used by an operator to open container holder 14. Container holder 14 further includes a body 52 (FIG. 2) attached to the inside of shell 44. Body 52 includes surfaces defining a pair of container holding apertures 54 and 56. A resilient flap 58 of Poron material (FIG. 3) is extended into container holding apertures 54 and 56 to engage and stabilize containers 59 (FIG. 9) placed in the container holding apertures 54 and 56 (FIG. 3).

Figure 12:
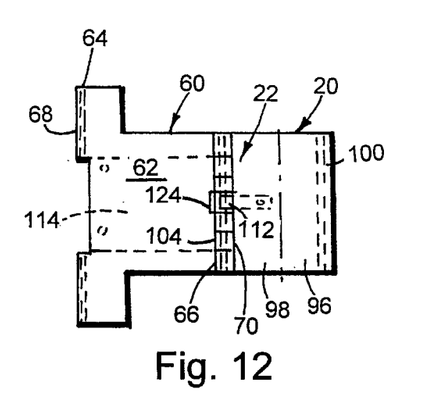
FIG. 12 is a top plan view of the lower hinge member and the container-holder-engaging member of the hinge mechanism shown in FIG. 9, the upper hinge member having been removed.

A container-holder-engaging base bracket 60 (FIGS. 7–10) is secured to the body (52) in a visually hidden position behind shell 44. The hinge mounting bracket 60 is T-shaped in plan view (FIG. 12) and is stamped from sheet metal. Bracket 60 (FIG. 8) includes a center section 62 attached to container holder body 52 and angled legs 64 and 66 that extend from opposing sides of center section 62, leg 64 being relatively wide and leg 66 being much narrower. The ends of the legs 64 and 66 include curled hole defining flanges 68 and 70, respectively, defining holes for receiving pivot pins 72 and 74. Pivot pins 72 and 74 define axes of rotation R1 and R2. Axes R1 and R2 are constantly changing location along paths "D" and "E", respectively, as container holder 14 is being moved, as discussed below.

Figure 11:
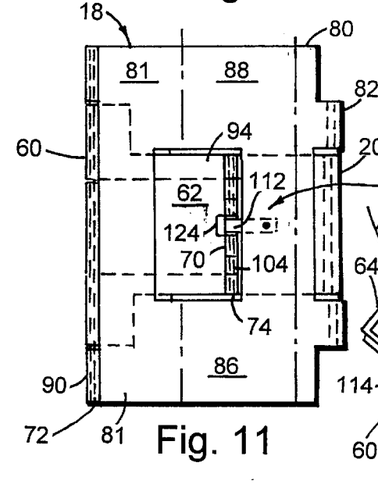
FIG. 11 is a top plan view of the hinge mechanism shown in FIG. 9, the hinge mechanism being shown in the use position.

Upper hinge member 18 is stamped frown sheet metal and is generally rectangularly-shaped in plan view (FIG. 11). A first end section 80 (FIGS. 9 and 11 ) of upper hinge member 18 includes hole defining flanges 82 which are alignable with upper pivot support 38 to define a "piano hinge" type arrangement. A pivot pin 84 extends through hole defining flanges 82 and through upper pivot support 38 on base 12 to define an axis of rotation R3. Three coil springs 78 (FIG. 4) are located around pivot pin 84 and engage base 12 and upper hinge member 18 to bias the container holder 14 toward the closed position. Upper hinge member 18 further includes a second end section 81 connected to first end section 80 by a pair of legs 86 and 88 that extend parallel to each other from first section 80. Second end section 81 includes hole defining flanges 90. Pivot pin 72 extends through flange 90 and hole defining flange 68 on hinge mounting bracket 60 at axis R1. Legs 86 and 88 define an aperture 94 therebetween in the center of upper hinge member 18. Notably, leg 66 of hinge mounting bracket 60 has a width sufficiently narrow to fit through aperture 94.

Lower hinge member 20 (FIG. 11) is stamped from sheet metal and also has a width sufficiently narrow to fit through aperture 94 between legs 86 and 88 of upper hinge member 18. Lower hinge member 20 (FIG. 12) includes first and second end sections 96 and 98. End section 96 includes hole defining flanges 100 for receiving pivot pin 102 (FIG. 9). Flanges 100 are configured to mateably align with lower support 40 on base 12 in a "piano hinge" type arrangement. Pivot pin 102 extends through lower pivot support 40 on base 12 to define an axis of rotation R4. Opposing second end section 98 includes hole defining flanges 104 for receiving pivot pin 74. Flanges 104 align with flanges 70 to define a "piano hinge" type arrangement. Pivot pin 74 extends through flanges 104 and 70, and as noted previously, defines axis of rotation R2.

A pressure sensitive release 22 (FIGS. 7–10) includes a cam 112 located on lower hinge member 20 and further includes a cam engaging leaf spring 114 located on hinge mounting bracket 60. Leaf spring 114 is riveted or otherwise secured to body 52 of hinge mounting bracket 60. A resiliently supported free end 116 of spring 114 extends toward a juncture of center section 62 and angled leg 66. The free end 116 of spring 114 defines an angled ramp 118. Cam 112 is attached to lower hinge member 20 adjacent pivot hole defining flanges 100. An arcuate surface 120 (FIG. 9) on cam 112 extends arcuately around pivot pin 74. Cam 112 includes a front tooth 122 (FIG. 10) configured to engage angled ramp 118 of leaf spring 114. When cam 112 is forced against angled ramp 118, it will force free end 116 away from hinge mounting bracket 60, allowing free end 116 to ride up onto arcuate surface 120. A slot 124 (FIGS. 10 and 11) in leg 66 of hinge mounting bracket 60 is positioned under free end 160 to receive cam 112 and, thus permit cam 118 to be moved under leaf spring 114. Optimally, cam 112 and leaf spring 114 are designed to allow cam 112 to ramp under leaf spring 114 and cause container holder 14 to move from the use position to the collapsed position at about 750 inch pounds of torque, although a different predetermined release force can be preset in design such as by use of different sized cams and different strength and shaped springs, if desired.

Figure 7:
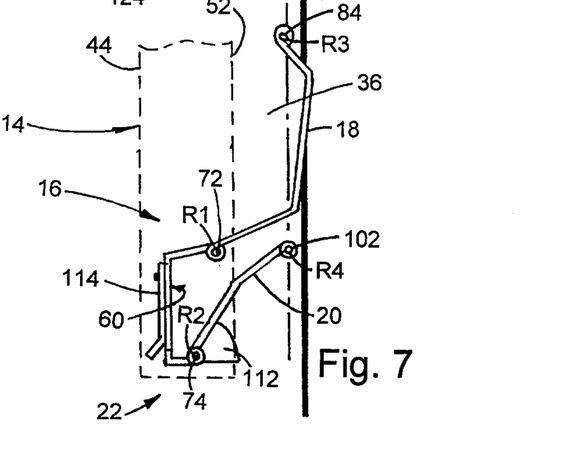
FIG. 7 is a left side schematic of the hinge mechanism shown in FIG. 5, the hinge mechanism being shown in the closed stored position and the container holder being shown in dashed lines.
Figure 8:
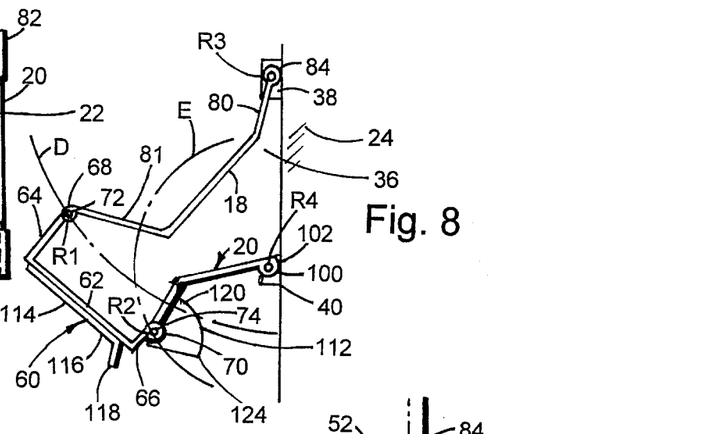
FIG. 8 is a left side schematic view of the hinge mechanism shown in FIG. 7, the hinge mechanism being shown in a partially open position.

Having described various parts and relationships in the disclosed apparatus, the operation and advantages of the present invention will become apparent to a person of ordinary skill in the art. Container holder 14 is initially positioned on base 12 in a storage position (FIGS. 1 and 7). Container holder 14 is pivotable toward an extended use position (FIG. 8) by grasping and pulling on finger hold depression 50 in container holder shell 44. As container holder 14 reaches the use position (FIG. 9), cam 112 of release 22 engages the end of leaf spring 114 of release 22 to hold container holder 14 in the use position. This positions container holding apertures 54 and 56 in an upwardly facing position so that containers can be stably positioned therein.

In the use position, there is a risk that container holder 14 may be accidentally forced downwardly, such as if container holder is accidentally stepped on or leaned on. If this over-pressure occurs, a torquing force is generated on container holder 14 around pivot pin 74. When the torquing force reaches a predetermined level, tooth 122 on cam 112 slides under angled ramp 118 on leaf spring 112, forcing free end 116 of spring 112 away from hinge mounting bracket 60. Cam 112 then slides under leaf spring 112 into slot 124 with the free end 116 of leaf spring 114 sliding along arcuate surface 120 on cam 112. This allows container holder 14 to drop downwardly to a collapsed position along a path C (FIG. 10). Thus, damage and deformation to the parts of container holder assembly 10 are avoided. Further, by grasping container holder 14 and moving container holder 14 back to the use position, release 22 re-engages (i.e. cam 112 releases leaf spring 114 and relocks against the angled ramp 118 of leaf spring 114).

The present invention is intended to include an arrangement wherein release 22 is incorporated into a lower hinge member 20 in a bi-folding hinge type arrangement. In such case the bi-folding hinge member would be held in the straight position by the pressure sensitive release (22), but releasable to a collapsed position wherein the bi-folding hinge member would collapse, thus pivoting the container holder (14) downwardly. Other arrangements are also possible, and this description should not be interpreted as being unduly limiting.

Upper and lower hinge members 18 and 20 move container holder 14 in a unique path which is particularly desirable when a container holder is positioned near to a floor, such as when positioning the container holder 14 in the lower rear of a center console as illustrated. More specifically, as container holder 14 is moved from the storage position (FIG. 7) to the extended position (FIG. 9), container holder 14 is lifted as it is extended outwardly along a path defined by arrows A and B in FIG. 2. This defines an apparent axis of rotation that changes and moves upwardly and outwardly as the container holder is pivoted to the use position from the storage position. Thus, container holder 14 is positioned in a relatively higher position, thus placing container holding apertures 54 and 56 in a more convenient location for access. At the same time, as container holder 14 is moved to the storage position, it moves to a lowered position and then is drawn flush to the rear vertical surface oil armrest/console component 24. Thus, armrest/console component 24 need not extend a large distance above the floor of the vehicle in order to accommodate container holder 14. Also, as container holder 14 moves in to the use position (FIG. 9) from the storage position, axis R2 (pivot pin 74) moves to an over-center relationship relative to axes R1 (pivot pin 72) and R4 (pivot pin 102). In particular, pivot pin 74 moves through a line between pivot pins 72 and 102. This position stabilizes container holder 14 in the use position.

Thus, there is provided a container holder assembly which is moveable between a storage and a use position, and which is further moveable to a damage preventing collapsed position by a pressure sensitive release which holds the container holder in the use position but permits the container holder to be moved to the collapsed position upon application of an excessive force on the container holder. In all three positions, the container holder remains attached to the base.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A container holder assembly comprising:
    a base;
    a container holder;
    a mechanism for movably mounting said container holder to said base for movement as a unit between a storage position, a use position and a released position; and
    a pressure sensitive release configured to hold said container holder in said use position while permitting said container holder to move as a unit to said released position from said use position upon application of a predetermined force on said container holder, said pressure sensitive release being re-engageable upon moving said container holder from said released position back to said use position.

2. A container holder assembly as defined in claim 1 wherein said mechanism includes a hinge.

3. A container holder assembly as defined in claim 2 wherein said pressure sensitive release is operably connected to said hinge.

4. A container holder assembly as defined in claim 1 wherein said mechanism includes a pair of hinge members, said pair of hinge members each being pivotally connected to said base and pivotally connected to said container holder, said pair of hinge members defining four separate axes of rotation so that an apparent axis of rotation of said container holder changes location as said container holder is moved between said storage and use positions.

5. A container holder assembly as defined in claim 4 wherein one of said axes moves through a line connecting two other of said axes in an over-center arrangement that stabilizes said container holder when in said use position.

6. A container holder assembly as defined in claim 1 wherein said pressure sensitive release includes a cam and a cam engaging member.

7. A container holder assembly as defined in claim 6 wherein said cam engaging member includes a leaf spring.

8. A container holder assembly comprising:
    a container holder;
    a mechanism for movably mounting said container holder to said base for movement between a storage position, a use position and a collapsed position;
    a pressure sensitive release configured to hold said container holder in said use position while permitting said container holder to move to said collapsed position from said use position upon application of a predetermined force on said container holder, said pressure sensitive release being re-engageable upon moving said container holder from said collapsed position back to said use position;
    said mechanism includes a pair of hinge members, said pair of hinge members each being pivotally connected to said base and pivotally connected to said container holder, said pair of hinge members defining four separate axes of rotation so that an apparent axis of rotation of said container holder changes location as said container holder is moved between said storage and use positions; and
    said pressure sensitive release being attached to at least one of said hinge members.

9. A container holder assembly as defined in claim 8 wherein said pressure sensitive release includes a cam located on one of said hinge member and a cam engaging member located on one of said container holder and said base.

10. A container holder assembly comprising:
    a base:
    a container holder;
    a mechanism for movably mounting said container holder to said base for movement between a storage position, a use position and a collapsed position;
    pressure sensitive release configured to hold said container holder in said use position while permitting said container holder to move to said collapsed position from said use position upon application of a predetermined force on said container holder, said pressure sensitive release being re-engageable upon moving said container holder from said collapsed position back to said use position;
    said mechanism includes a pair of hinge members, said pair of hinge members each being pivotally connected to said base and pivotally connected to said container holder, said pair of hinge members defining four separate axes of rotation so that an apparent axis of rotation of said container holder changes location as said container holder is moved between said storage and use positions; and
    one of said hinge members including an opening and the other of said hinge members including a section that extends into said opening during movement between said storage position and said collapsed position.

11. A container holder assembly comprising:
    a base;
    a container holder;
    a mechanism for movably mounting said container holder to said base for movement between a storage position, a use position and a collapsed position;

a pressure sensitive release configured to hold said container holder in said use position while permitting said container holder to move to said collapsed position from said use position upon application of a predetermined force on said container holder, said pressure sensitive release being re-engageable upon moving said container holder from said collapsed position back to said use position; and said base including a recess, and said container holder including surfaces defining a container holding aperture adapted to fit within said recess, and container holding aperture being positioned within said recess and covered when said container holder is in said storage position, but said container holding aperture being extended from said recess and ready for use when said container holder is in said use position, said container holder further being positioned generally below said recess in a safety position when in said collapsed position.

12. An apparatus comprising:

a base;

a container holder;

a first hinge member pivotally connecting said container holder to said base and defining first and second axes of rotation;

a second hinge member pivotally connecting said container holder to said base and defining third and fourth axes of rotation, said first, second, third and fourth axes of rotation being parallel and non-aligned, said second hinge member being spaced from said first hinge member and cooperating with said first hinge member to move said container holder between a storage position and a use position; and a pressure sensitive release operably connected to one of said hinge members, said pressure sensitive release being configured to release said container holder from said use position to a release position upon application of a predetermined force on said container holder.

13. A container holder assembly comprising:

a base including a generally vertical surface and a recess defined in said generally vertical surface;

a container holder including a shaped surface defining a container holder aperture;

linkage means movably interconnecting said container holder to said base for movement between a use position and a storage position, said linkage means pivotally movably mounting said container holder to said base so that said shaped surface is positioned adjacent said vertical surface when in said storage position, and so that said container holder moves generally upwardly and outwardly about a changing axis of rotation when moved from said storage position toward said use position; and a release operably connected to said linkage means for holding said container holder in said use position but for releasing said container holder to a release position upon application of a predetermined force to thus prevent damage to said container holder.

14. An apparatus comprising:

a base including a recess;

a container holder configured to cover said recess;

a hinge operably connecting said container holder to said base for movement between a storage position wherein said container holder is positioned in said recess and a use position wherein said container holder is extended from said base, said hinge including a first hinge member pivotally connecting said base and said container holder to define first and second hinge axes and further including a second hinge member pivotally connecting said container holder and said base to define third and fourth hinge axes, said first and third hinge axes being spaced from each other and said second and fourth hinge axes being spaced from each other, whereby said container holder pivots about a changing axis of rotation as said container holder is moved between said storage position and said use position; and a releasable stop connected to one of said first and second hinge members at one of said first, second, third and fourth axes to limit the rotation of said one hinge member at said use position, said releasable stop being releasable so that said container holder moves away from said use position to a collapsed position if a predetermined amount of force is applied to said container holder to avoid damage to said container holder.

15. An apparatus as defined in claim 14 wherein said releasable stop includes a cam and a cam engaging member.

16. An apparatus as defined in claim 15 wherein said cam has a quarter circular shape.

17. A hinge construction for supporting a container holder for movement as a unit relative to a vehicle component, comprising:

a first bracket configured for attachment to a container holder and defining first and second spaced apart pivots;

a second bracket configured for attachment to a side of a vehicle component and defining third and fourth spaced apart pivots;

a first link pivotally connected at its ends to said first and third pivots and a second link pivotally connected at its ends to said second and fourth pivots;

said first and second brackets and said first and second links forming a double bar linkage arrangement for moving the first bracket and the container holder between an upright storage position located generally adjacent the second bracket, an extended container-supporting position located generally horizontally from the second bracket, and a damage-preventing released position located generally below the second bracket; and a release mechanism operably connected to one of said brackets and links for holding said first bracket in said container-supporting position, said release mechanism being configured to support the weight of a container when in the container-supporting position but further being configured to release to said released position upon receiving a destructive force applied to said first bracket to prevent damage to said brackets and links.

18. A hinge construction as defined in claim 17 wherein said release mechanism is resettable by moving said first bracket from said released position to said container-supporting position.

19. A hinge construction as defined in claim 18 wherein said release mechanism includes a resilient member attached to said one of said links and brackets.

20. A hinge construction as defined in claim 19 wherein said resilient member includes a spring, and including a spring-engaging member on another of said first bracket, said second bracket, said first link and said second link for engaging said spring.

21. A hinge construction for movably supporting a container holder in a vehicle comprising:

a base bracket configured for attachment to a base including a recess;

a container holder bracket configured for attachment to a container holder configured to cover the recess;

a double bar hinge construction operably connecting said container holder bracket to said base bracket for movement between a storage position wherein the container holder bracket is positioned proximate the container holder bracket so that the container holder covers the recess and a use position wherein the container holder bracket is extended from said base bracket, said double bar linkage construction pivoting said container holder bracket about a changing axis of rotation as said container holder bracket is moved between said storage position and said use position; and a releasable stop operably connected to said double bar hinge construction for holding said container holder bracket in said use position, said releasable stop being configured to support the weight of a container when in the use position but being releasable so that said container holder bracket moves from said use position to a released position if a predetermined destructive force is applied to said container holder to avoid damage to the hinge construction and the container holder bracket.

22. A hinge construction as defined in claim 21 wherein said hinge includes a first hinge link pivotally connecting said base bracket and said container holder bracket to define first and second hinge axes and further includes a second hinge link pivotally connecting said container holder bracket and said base bracket to define third and fourth hinge axes, said first and third hinge axes being spaced from each other and said second and fourth hinge axes being spaced from each other, said hinge construction forming a four-bar linkage arrangement with said base bracket and said container holder bracket.

23. A hinge construction as defined in claim 21 wherein said releasable stop includes a cam and a cam engaging member.

24. A hinge construction as defined in claim 23 wherein said cam has a quarter circular shape.

25. A hinge construction as defined in claim 21 wherein said releasable stop includes a resilient member.

26. A hinge construction as defined in claim 25 wherein said resilient member includes a spring and further includes a spring-engaging member.

* * * * *

UNITED STATES PATENT AND TRADEMARK OFFICE
CERTIFICATE OF CORRECTION

PATENT NO. : 5,516,016  
DATED : May 14, 1996  
INVENTOR : Rick A. Anderson, et al.

Page 1 of 4

It is certified that error appears in the above-identified patent and that said Letters Patent is hereby corrected as shown below:

Title page, Below "Primary Examiner - Renee S. Luebke", insert -- Attorney, Agent, or Firm - Price, Heneveld, Cooper, DeWitt & Litton--.

Column 1, line 11, both occurrences;

"time" should be --the--.

Column 1, line 17, both occurrences;

"time" should be --the--.

Column 1, line 22;

"time" should be --the--.

Column 1, line 31;

"time" should be --the--.

UNITED STATES PATENT AND TRADEMARK OFFICE
CERTIFICATE OF CORRECTION

PATENT NO.  : 5,516,016
DATED       : May 14, 1996
INVENTOR    : Rick A. Anderson, et al.

It is certified that error appears in the above-identified patent and that said Letters Patent is hereby corrected as shown below:

Column 1, line 32;

"time" should be --the--.

Column 1, line 43, both occurrences;

"time" should be --the--.

Column 1, line 44;

"time" should be --the--.

Column 1, line 45;

"time" should be --the--.

UNITED STATES PATENT AND TRADEMARK OFFICE
CERTIFICATE OF CORRECTION

PATENT NO. : 5,516,016
DATED : May 14, 1996
INVENTOR : Rick A. Anderson, et al.

It is certified that error appears in the above-identified patent and that said Letters Patent is hereby corrected as shown below:

Column 3, line 28;

"frown" should be --from--.

Column 4, line 19;

After "design" should be --,--.

Column 5, line 12;

"oil" should be --on--.

Column 6, between lines 8 & 9;

Insert new paragraph "a base;".

UNITED STATES PATENT AND TRADEMARK OFFICE
CERTIFICATE OF CORRECTION

PATENT NO. : 5,516,016
DATED : May 14, 1996
INVENTOR : Rick A. Anderson, et al.

It is certified that error appears in the above-identified patent and that said Letters Patent is hereby corrected as shown below:

Column 6, line 37;

After "a base", the ":" should be --;--.

Column 7, line 11;

"and" should be --said--.

Signed and Sealed this

Twenty-sixth Day of November 1996

Attest:

BRUCE LEHMAN

Attesting Officer

Commissioner of Patents and Trademarks